US007757488B2

(12) United States Patent
Dunlap, III

(10) Patent No.: US 7,757,488 B2
(45) Date of Patent: Jul. 20, 2010

(54) MASTER CYLINDER ASSEMBLY FOR A HYDRAULIC ACTUATION SYSTEM FOR A HANDLEBAR-STEERED VEHICLE

(75) Inventor: Charles Emmett Dunlap, III, Manitou Springs, CO (US)

(73) Assignee: SRAM, LLC, Chicago, IL (US)

( * ) Notice: Subject to any disclaimer, the term of this patent is extended or adjusted under 35 U.S.C. 154(b) by 227 days.

(21) Appl. No.: 11/761,194

(22) Filed: Jun. 11, 2007

(65) Prior Publication Data

US 2008/0302101 A1 Dec. 11, 2008

(51) Int. Cl.
*B60T 7/08* (2006.01)
*B60T 11/26* (2006.01)
*F15B 7/08* (2006.01)

(52) U.S. Cl. .......................................... 60/594; 60/588
(58) Field of Classification Search ................... 60/565, 60/588, 594
See application file for complete search history.

(56) References Cited

U.S. PATENT DOCUMENTS

| 6,003,639 | A * | 12/1999 | Buckley et al. ............... 188/26 |
| 6,769,254 | B2 * | 8/2004 | Heller et al. ................... 60/588 |
| 6,871,729 | B2 * | 3/2005 | Huster et al. ................... 60/594 |
| 6,957,534 | B2 | 10/2005 | Lumpkin |
| 6,973,784 | B2 * | 12/2005 | Okuma ......................... 60/588 |
| 7,219,495 | B2 * | 5/2007 | Ludsteck et al. .............. 60/588 |
| 2006/0213192 | A1 | 9/2006 | Henifin |

FOREIGN PATENT DOCUMENTS

GB 2 141 498 A 12/1984

* cited by examiner

*Primary Examiner*—Michael Leslie
(74) *Attorney, Agent, or Firm*—Milan Milosevic; Lisa Serdynski

(57) ABSTRACT

A master cylinder assembly for a hydraulic actuation system for a handlebar-steered vehicle. The assembly includes a housing mountable to a frame member of the handlebar-steered vehicle and having a chamber including a fluid cavity with first and second regions. The first region is in fluid communication with the hydraulic actuation system. A piston is slidably disposed in the fluid cavity. An actuator is operatively connected to the housing and operatively connected to the piston to slidably displace the piston between an open fluid circuit position and a closed fluid circuit position. A first seal is disposed on either the piston or a wall of the fluid cavity. The first seal is configured to be in sealing engagement between the fluid cavity and the piston with the piston in the closed fluid circuit position to block fluid flow between the first and second fluid cavity regions. The first seal is configured to be in non-sealing disengagement between the fluid cavity wall and the piston with the piston in the open fluid circuit position to permit fluid flow between the first and second fluid cavity regions.

35 Claims, 4 Drawing Sheets

MASTER CYLINDER ASSEMBLY FOR A HYDRAULIC ACTUATION SYSTEM FOR A HANDLEBAR-STEERED VEHICLE

BACKGROUND OF THE INVENTION

The present invention relates to hydraulic actuation systems for handlebar-steered vehicles and more particularly to a master cylinder assembly for a hydraulic actuation system.

SUMMARY OF THE INVENTION

The master cylinder assembly generally includes a housing, a fluid cavity, an actuator, a piston assembly, and a first seal. The housing is mounted to a frame member of the handlebar-steered vehicle and has a chamber that includes the fluid cavity, the fluid cavity having first and second regions. The first region is in fluid communication with the hydraulic actuation system. The piston assembly includes a piston that is slidably disposed within the fluid cavity. The actuator is operatively connected to the housing and operatively connected to the piston to slidably displace the piston between an open fluid circuit position and a closed fluid circuit position. The piston may be biased toward the open fluid circuit position. The first seal is disposed on either the piston or a wall of the fluid cavity. The first seal is configured to be in sealing engagement between the fluid cavity wall and the piston with the piston in the closed fluid circuit position to block fluid flow between the first and second fluid cavity regions. The first seal is configured to be in non-sealing disengagement between the fluid cavity wall and the piston with the piston in the open fluid circuit position to permit fluid flow between the first and second fluid cavity regions.

In one embodiment of the present invention, the first seal is configured to be deformed in sealing engagement between the fluid cavity wall and the piston with the piston in the closed fluid circuit position. The first seal is configured to be undeformed in non-sealing disengagement between the fluid cavity wall and the piston with the piston in the open fluid circuit position.

In another embodiment of the present invention, the piston is slidably displaced between the open fluid circuit position in the second fluid cavity region having a second cross-sectional area, and a closed fluid circuit position in the first fluid cavity region having a first cross-sectional area, the second cross-sectional area being greater than the first cross-sectional area. The fluid cavity may include a tapered transitional region connecting the first and second regions.

In another embodiment of the present invention, the piston includes first and second portions. The first seal is disposed on the first portion of the piston. A second seal is configured to be in sealing engagement between the second portion of the piston and a wall of the second fluid cavity region. A flexible bladder is attached to the first and second portions of the piston and surrounds the piston. The housing chamber includes an air cavity and the flexible bladder sealingly separates the air cavity from the fluid cavity. The piston assembly includes a pushrod that operatively connects the piston and the actuator. The first fluid cavity region is cylindrical.

These and other features and advantages of the present invention will be more fully understood from the following description of one or more embodiments of the invention, taken together with the accompanying drawings.

DETAILED DESCRIPTION

Figure 1:
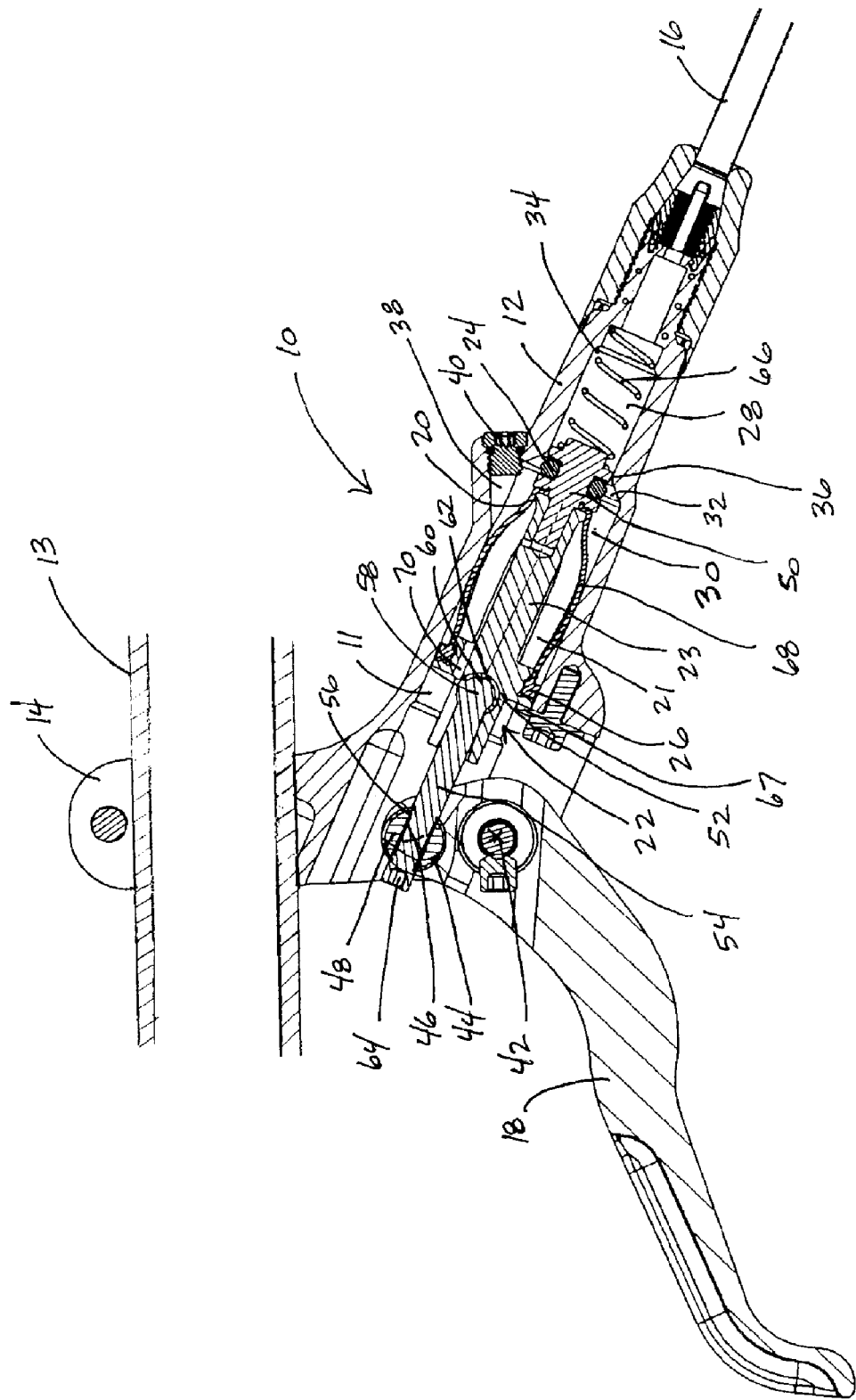
FIG. 1 is a cross-sectional view of a master cylinder assembly showing a piston in an open fluid circuit position according to one embodiment of the present invention.
Figure 2:
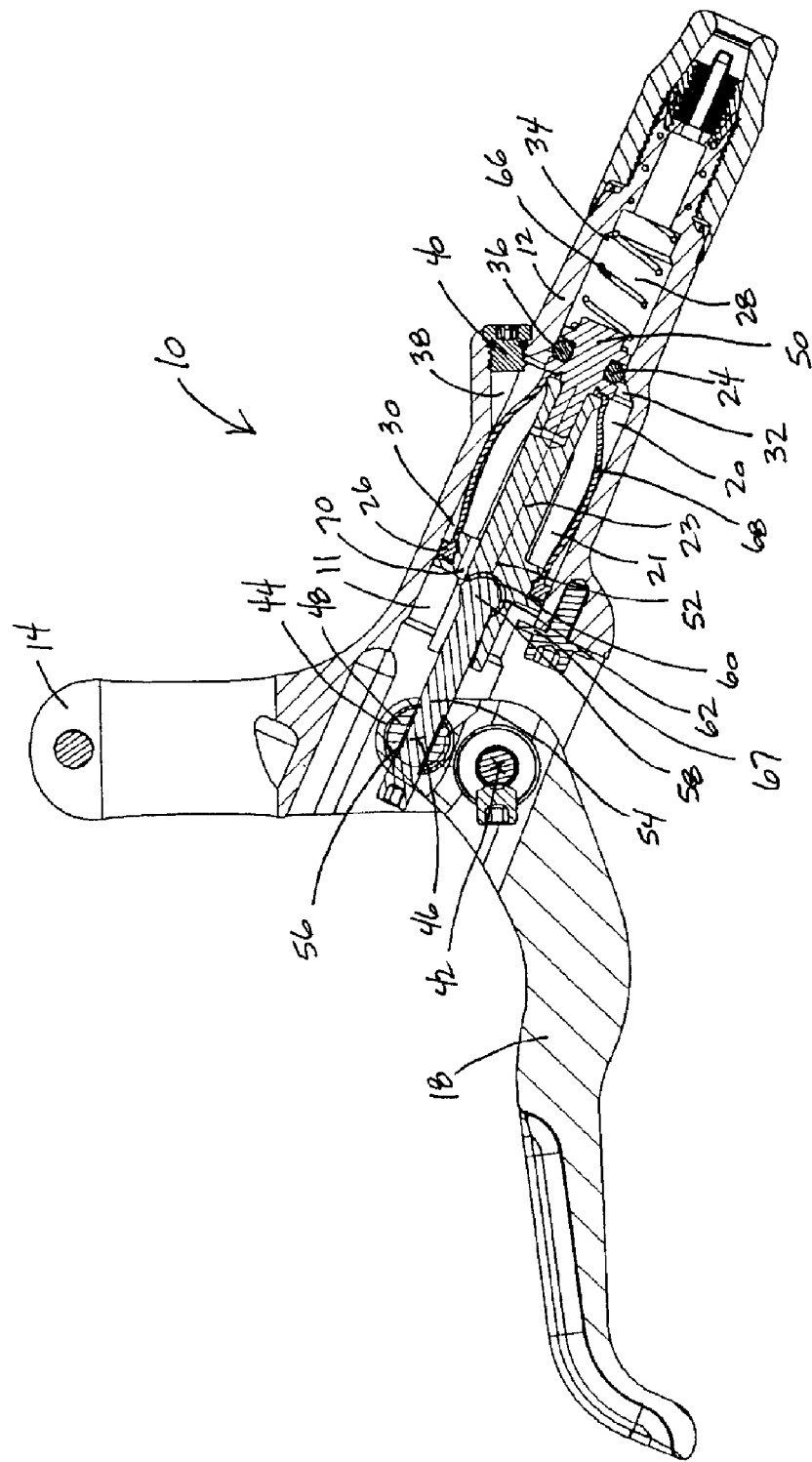
FIG. 2 is a cross-sectional view of the master cylinder assembly of FIG. 1 showing the piston in a closed fluid circuit position.
Figure 3:
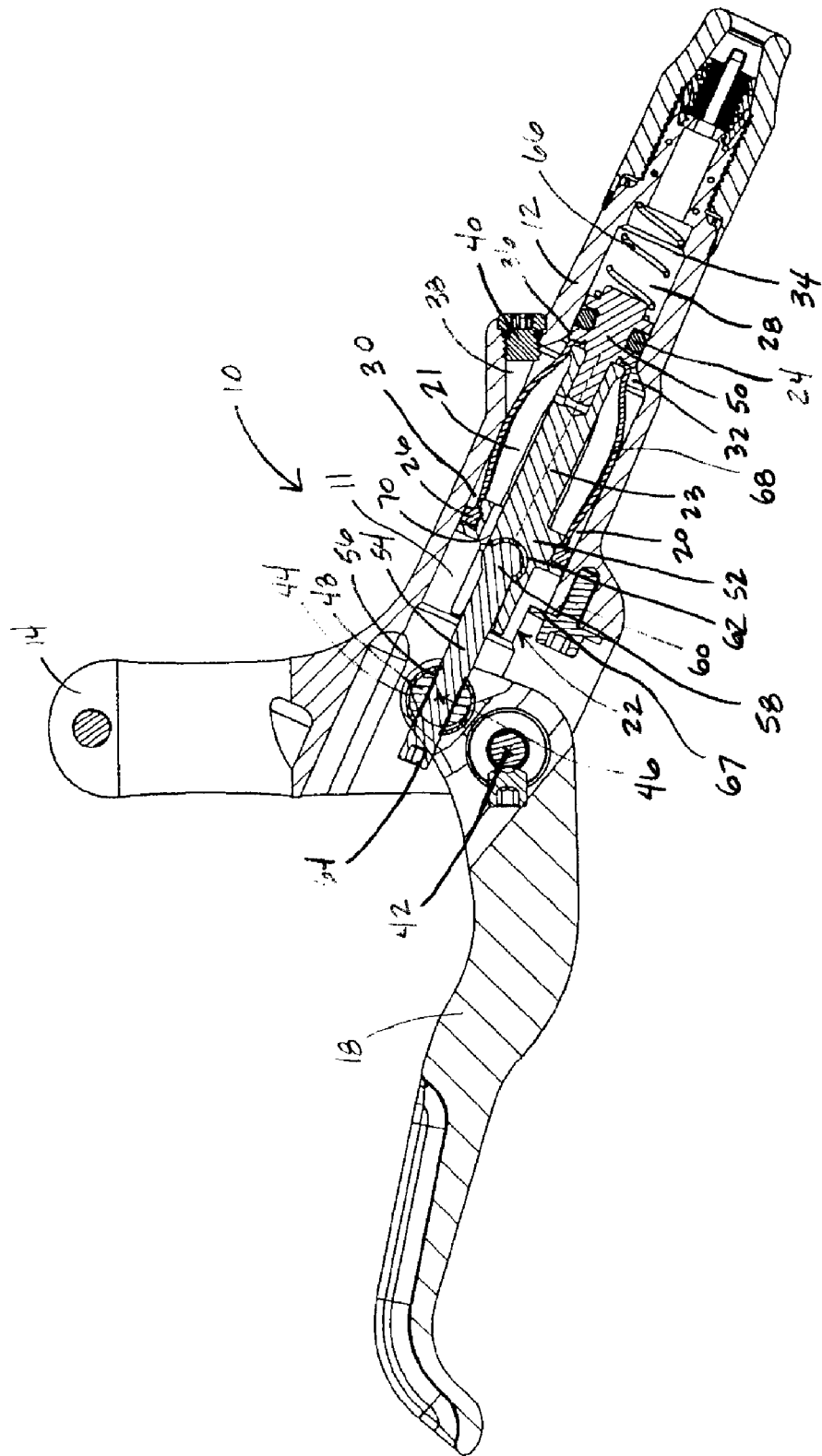
FIG. 3 is a cross-sectional view of the master cylinder assembly of FIG. 1 showing the piston in another closed fluid circuit position.

FIGS. 1-3 illustrate a master cylinder assembly 10 for a hydraulic actuation system for a handlebar-steered vehicle according to one embodiment of the present invention. The master cylinder assembly 10 includes a housing 12 mountable to a frame member of the handlebar-steered vehicle, in this embodiment to a handlebar 13, by a clamp 14. The master cylinder assembly 10 is operatively connected to a slave cylinder assembly (not shown) by a hydraulic line 16 to operate the hydraulic actuation system. In this embodiment, the master cylinder assembly 10 is designed to be used with a bicycle hydraulic brake system but may be adapted to be used with a clutch system. The master cylinder assembly 10 generally includes the housing 12, a fluid cavity 20, an actuator 18, a piston assembly 22 and first and second seals 24, 26. The housing 12 includes a chamber 11 that includes the fluid cavity 20 and an air cavity 21. The fluid cavity 20 includes first and second regions 28, 30 and a tapered transitional region 32 therebetween. In the embodiment shown, the first fluid cavity region 28 has a smaller cross-sectional area than a cross-sectional area of the second fluid cavity region 30. One end 34 of the first region 28 is in fluid communication with the hydraulic line 16 and the other end 36 is adjacent the tapered transitional region 32 of the fluid cavity 20. In this embodiment, the transitional region 32 is tapered but may have a different shape or may be eliminated entirely, for example, by a stepped transition between first and second regions 28, 30. The first and second regions 28, 30, in this embodiment are cylindrical, however, the regions 28, 30 may form a variety of shapes. The housing 12 includes a fill hole 38 for filling the fluid cavity 20 with fluid. A screw 40 is threaded into the fill hole 38.

The actuator 18, in this embodiment a lever, is pivotably connected to the housing 12 about a pivot axis 42. The lever 18 includes a pocket 44 spaced from the pivot axis 42 and extending along an axis 46 parallel to the pivot axis 42. A cross dowel 48 is received in the pocket 44. The cross dowel 48 includes a threaded pocket (not shown) transverse the dowel axis 46.

Figure 4:
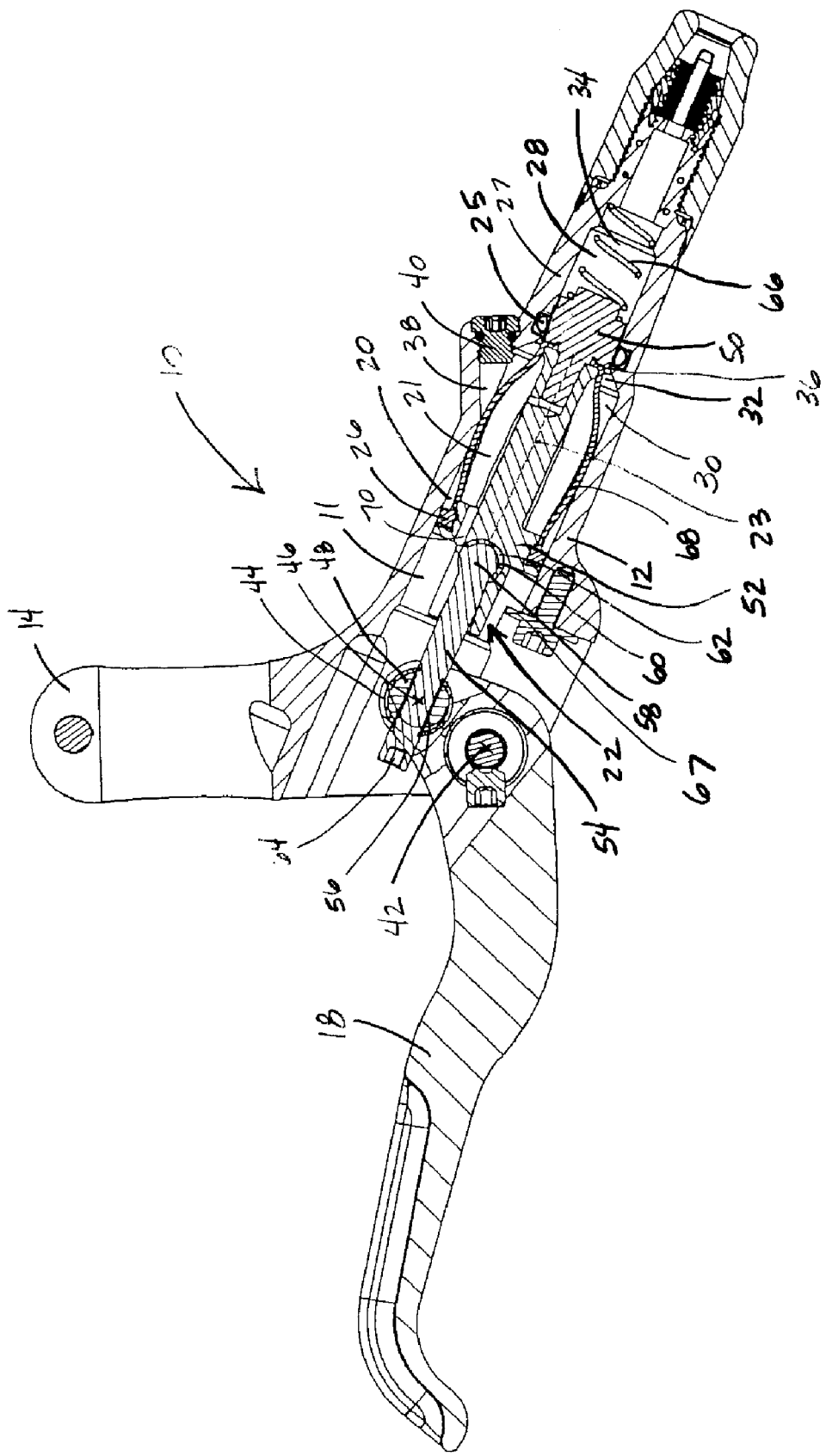
FIG. 4 is a cross-sectional view of a master cylinder assembly according to another embodiment of the present invention.

The piston assembly 22 includes a piston 23 that is slidably disposed within the fluid cavity 20 and has first and second portions 50, 52. The piston 23 is slidably displaceable between an open fluid circuit position (see FIG. 1) that permits fluid flow between the first and second fluid cavity regions 28, 30 and closed fluid circuit positions (see FIGS. 2 and 3) that block fluid flow between the first and second fluid cavity regions 28, 30. The first seal 24, in this embodiment an O-ring, is disposed on the first portion 50 of the piston 23 and the second seal 26 is disposed on the second portion 52 of the piston 23. Alternatively, in another embodiment, a first seal 25 may be disposed on a wall 27 of the fluid cavity 20 (see FIG. 4). A pushrod 54 is connected to the second portion 52 of the piston 23. The pushrod 54 includes a threaded portion 56 proximate one end and a head 58 proximate the other end. The head 58 includes a ball surface 60 received in a corresponding cup surface 62 in the second portion 52 of the piston 23. The threaded portion 56 of the pushrod 54 is threadably received in the threaded pocket of the cross dowel 48. The end of the pushrod 54 includes a hex opening 64 for receiving an Allen wrench for adjusting the position of the lever 18, or reach, relative to the handlebar 13. A coil spring 66 is disposed in the first fluid cavity 28 and is configured to abut the first portion 50 of the piston 23 to bias the piston 23 toward the open fluid circuit position against a stop element 67. A flexible bladder 68 surrounds the piston 23. One end of the bladder 68 is attached to the first portion 50 of the piston 23 and the other end of the bladder 68 is attached to the second portion 52 of the piston 23. The flexible bladder 68 sealingly separates the air cavity 21 from the fluid cavity 20. The piston 23 includes a duct 70 to permit ambient venting of the air cavity 21. In this embodiment, the second seal 26 and the bladder 68 embody a single piece.

In FIG. 1, the lever 18 is shown in a rest position with the first seal 24 in non-sealing disengagement between the fluid cavity wall and the piston 23 with the piston 23 in the open fluid circuit position to permit fluid flow between the first and second fluid cavity regions 28, 30. For the first seal 24 to be in non-sealing disengagement, the first seal 24 need not be disengaged from both the fluid cavity wall and the piston 23.

Looking to FIG. 2, as the lever 18 is pivoted toward the clamp 14, the pushrod 54 is driven toward the first fluid cavity region 28, which in turn, causes the piston 23 to slidably displace toward the first fluid cavity region 28. As the piston 23 slidably displaces toward the first fluid cavity region 28, the first seal 24 sealingly engages between a wall of the first cavity region 28 and the piston 23 thereby closing the fluid circuit to block fluid flow between the first and second fluid cavity regions 28, 30. This blockage builds pressure in the first fluid cavity region 28, and in turn, pressurizes fluid within the hydraulic line 16 resulting in actuation of the slave cylinder assembly of the hydraulic brake system. In this embodiment, the first seal 24 is deformed and undeformed to provide sealing engagement and non-sealing disengagement, respectively, between a wall of the fluid cavity region 28 and the piston 23. Looking to FIG. 3, as the lever 18 is further actuated, the pressure in the first region 28 increases, resulting in increased braking force. When the lever 18 is released, the spring 66 displaces the piston 23 back toward the open fluid circuit position, the first seal 24 disengaging the wall of the fluid cavity region 28 to permit fluid flow between the first and second fluid cavity regions 28, 30 thereby equalizing pressure throughout the fluid cavity 20.

While this invention has been described by reference to a particular embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A master cylinder assembly for a hydraulic actuation system for a handlebar-steered vehicle, the master cylinder assembly comprising:
   a housing mountable to a frame member of the handlebar-steered vehicle and having a chamber including a fluid cavity and an air cavity, the fluid cavity having first and second regions, the first region in fluid communication with the hydraulic actuation system;
   a piston assembly including a piston slidably disposed within the fluid cavity;
   an actuator operatively connected to the housing and operatively connected to the piston to slidably displace the piston between an open fluid circuit position and a closed fluid circuit position;
   a first seal disposed on one of the piston and a wall of the fluid cavity; and
   a sealingly-separating member separating the air cavity from the fluid cavity, at least a portion of the sealing-separating member attached to and slidably displaced with the piston,
   the first seal configured to be in sealing engagement between the fluid cavity wall and the piston with the piston in the closed fluid circuit position to block fluid flow between the first and second fluid cavity regions,
   the first seal configured to be in non-sealing disengagement between the fluid cavity wall and the piston with the piston in the open fluid circuit position to permit fluid flow between the first and second fluid cavity regions.

2. The master cylinder assembly of claim 1, wherein the piston is slidably displaced between the open fluid circuit position in the second fluid cavity region having a second cross-sectional area and the closed fluid circuit position in the first fluid cavity region having a first cross-sectional area, the second cross-sectional area being greater than the first cross-sectional area.

3. The master cylinder assembly of claim 2, wherein the first seal is configured to be deformed in sealing engagement between the fluid cavity wall and the piston with the piston in the closed fluid circuit position, the first seal configured to be undeformed in non-sealing disengagement between the fluid cavity wall and the piston with the piston in the open fluid circuit position.

4. The master cylinder assembly of claim 3, wherein the piston is biased toward the open fluid circuit position.

5. The master cylinder assembly of claim 4, wherein the actuator is a lever pivotably attached to the housing and the frame member is a handlebar.

6. The master cylinder assembly of claim 5, wherein the fluid cavity includes a tapered transitional region connecting the first and second fluid cavity regions.

7. The master cylinder assembly of claim 6, wherein the first region of the fluid cavity is cylindrical.

8. The master cylinder assembly of claim 7, further comprising a second seal, the piston includes first and second portions, the first seal disposed on the first portion of the piston, the second seal disposed on the second portion of the piston and configured to be in sealing engagement between the second portion of the piston and a wall of the second fluid cavity region.

9. The master cylinder assembly of claim 8, wherein the sealingly separating member is a flexible bladder having a first end attached to the first portion of the piston and a second end attached to the second portion of the piston, the flexible bladder sealingly separating the fluid cavity from the air cavity.

10. The master cylinder assembly of claim 9, wherein the piston assembly includes a pushrod operatively connecting the piston and the lever.

11. The master cylinder assembly of claim 1, further comprising a second seal, the piston includes first and second portions, the first seal disposed on the first portion of the piston, the second seal disposed on the second portion of the piston and configured to be in sealing engagement between the second portion of the piston and a wall of the second fluid cavity region.

12. The master cylinder assembly of claim 11, wherein the sealingly separating member is a flexible bladder having a first end attached to the first portion of the piston and a second end attached to the second portion of the piston, the flexible bladder sealingly separating the fluid cavity from the air cavity.

13. The master cylinder assembly of claim 1, wherein the piston assembly includes a pushrod operatively connecting to the piston and the actuator.

14. The master cylinder assembly of claim 1, wherein the piston is biased toward the open fluid circuit position.

15. The master cylinder assembly of claim 1, wherein the first region of the fluid cavity is cylindrical.

16. The master cylinder assembly of claim 1, wherein the first seal is configured to be deformed in sealing engagement between the fluid cavity wall and the piston with the piston in the closed fluid circuit position, the first seal configured to be undeformed in non-sealing disengagement between the fluid cavity wall and the piston with the piston in the open fluid circuit position.

17. The master cylinder assembly of claim 1, wherein the actuator is a lever pivotably attached to the housing and the frame member is a handlebar.

18. The master cylinder assembly of claim 1, wherein the fluid cavity includes a tapered transitional region connecting the first and second fluid cavity regions.

19. The master cylinder assembly of claim 1, wherein the air cavity is ambient vented.

20. The master cylinder assembly of claim 1, wherein the first seal is disposed on the wall of the fluid cavity.

21. The master cylinder assembly of claim 20, wherein the fluid cavity includes a tapered transitional region connecting the first and second fluid cavity regions.

22. A master cylinder assembly for a hydraulic actuation system for a handlebar-steered vehicle, the master cylinder assembly comprising:
   a housing mountable to a handlebar and having a chamber including a fluid cavity and an air cavity, the fluid cavity having first and second regions, the first region in fluid communication with the hydraulic actuation system;
   a piston assembly having a piston slidably disposed within the fluid cavity, the piston having first and second portions;
   an actuator operatively connected to the housing and operatively connected to the piston to slidably displace the piston between an open fluid circuit position and a closed fluid circuit position;
   a first seal disposed on the first portion of the piston and configured to be in sealing engagement between a wall of the fluid cavity and the first portion of the piston with the piston in the closed fluid circuit position to block fluid flow between the first and second fluid cavity regions,
   the first seal configured to be in non-sealing disengagement between the wall of the fluid cavity and the piston with the piston in the open fluid circuit position to permit fluid flow between the first and second fluid cavity regions;
   a second seal disposed on the second portion of the piston and configured to be in sealing engagement between the second portion of the piston and a wall of the second fluid cavity region; and
   a flexible bladder having a first end attached to the first portion of the piston and a second end attached to the second portion of the piston, the flexible bladder sealingly separating the fluid cavity from the air cavity.

23. The master cylinder assembly of claim 22, wherein the piston is slidably displaced between the open fluid circuit position in the second fluid cavity region having a second cross-sectional area and the closed fluid circuit position in the first fluid cavity region having a first cross-sectional area, the second cross-sectional area being greater than the first cross-sectional area.

24. The master cylinder assembly of claim 23, wherein the first seal is configured to be deformed in sealing engagement between the fluid cavity wall and the piston with the piston in the closed fluid circuit position, the first seal configured to be undeformed in non-sealing disengagement between the fluid cavity wall and the piston with the piston in the open fluid circuit position.

25. The master cylinder assembly of claim 24, wherein the piston is biased toward the open fluid circuit position.

26. The master cylinder assembly of claim 25, wherein the actuator is a lever pivotably attached to the housing.

27. The master cylinder assembly of claim 26, wherein the fluid cavity includes a tapered transitional region connecting the first and second fluid cavity regions.

28. The master cylinder assembly of claim 27, wherein the first region of the fluid cavity is cylindrical.

29. The master cylinder assembly of claim 28, wherein the flexible bladder surrounds the piston.

30. The master cylinder assembly of claim 29, wherein the piston assembly includes a pushrod operatively connecting the piston and the lever.

31. The master cylinder assembly of claim 22, wherein the piston assembly includes a pushrod operatively connecting to the piston and the actuator.

32. The master cylinder assembly of claim 22, wherein the piston is biased toward the open fluid circuit position.

33. The master cylinder assembly of claim 22, wherein the first region of the fluid cavity is cylindrical.

34. The master cylinder assembly of claim 22, wherein the first seal is configured to be deformed in sealing engagement between the fluid cavity wall and the piston with the piston in the closed fluid circuit position, the first seal configured to be undeformed in non-sealing disengagement between the fluid cavity wall and the piston with the piston in the open fluid circuit position.

35. The master cylinder assembly of claim 22, wherein the actuator is a lever pivotably attached to the housing.

* * * * *